July 27, 1948. F. T. SHAW 2,445,927
ELECTRICAL PLUG AND SOCKET CONNECTIONS
Filed May 8, 1946
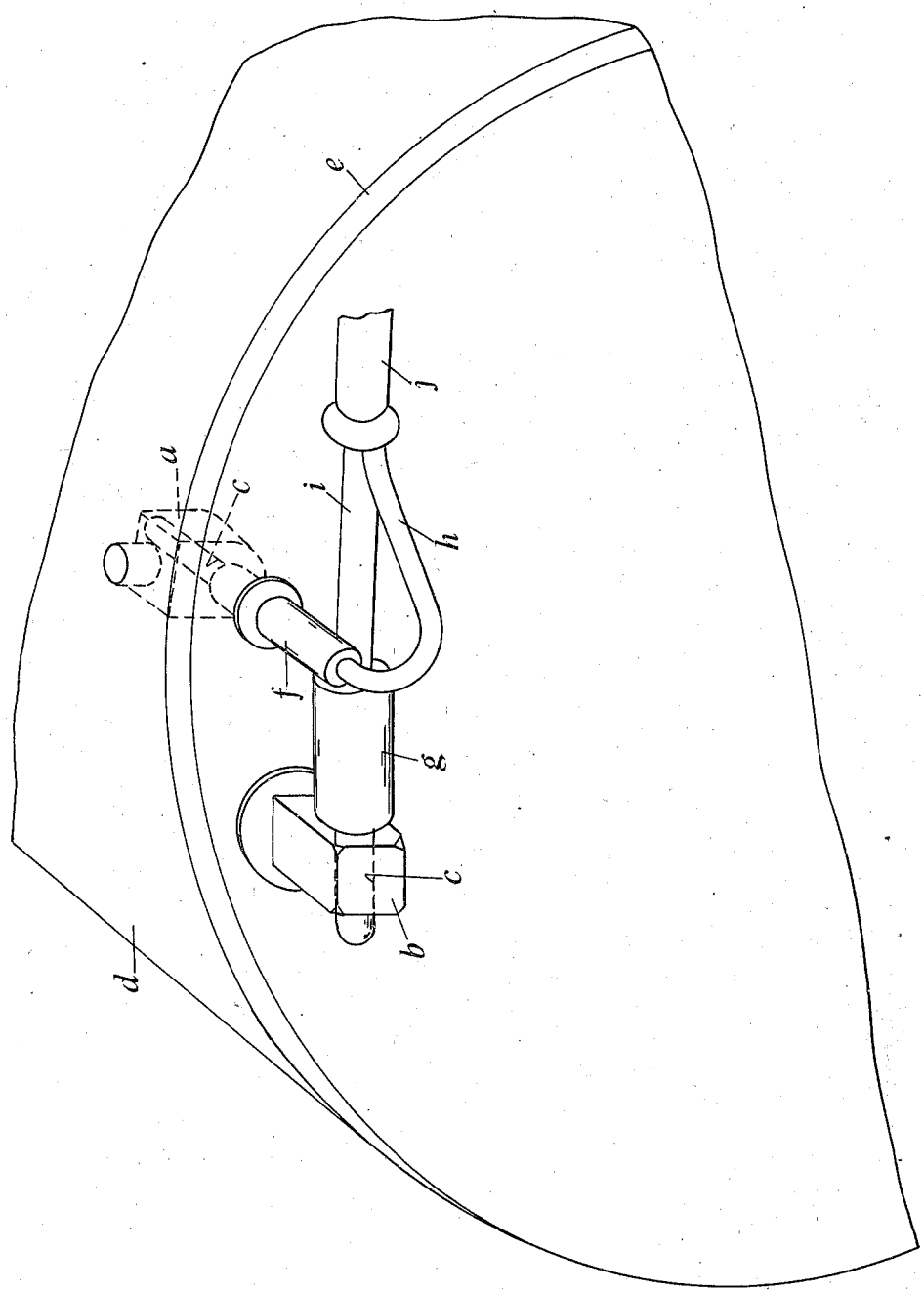
Inventor
F. T. Shaw
By Glascock Downing  Seebold
Attys.

Patented July 27, 1948

2,445,927

UNITED STATES PATENT OFFICE 2,445,927

ELECTRICAL PLUG AND SOCKET CONNECTIONS

Frederick Talbot Shaw, Birmingham, England, assignor to Joseph Lucas Limited, Birmingham, England Application May 8, 1946, Serial No. 668,102
In Great Britain May 28, 1945

2 Claims. (Cl. 173—328)

This invention relates to electrical plug and socket connections, and particularly such connections for use on electric dynamos or motors, the object of the invention being to enable interlocking of the connections to be effected in a very simple and convenient manner.

The accompanying drawing is a perspective view of electrical connecting means embodying the invention and suitable for use with a small dynamo to effect connection of one end of the field winding and one of the collecting brushes to two external conductors.

In carrying the invention into effect as shown, I employ a pair of socket components $a$, $b$ to which one end of the field winding and one of the collecting brushes of the dynamo are to be respectively connected. Each of the socket components $a$, $b$ consists of a metal post having a hole $c$ formed transversely through it near one end of the post, the other end of the post being adapted for screw or other connection to a fixed part of the dynamo. For example the socket component $a$ to which one end of the field winding is to be connected may be secured through the medium of insulating means to the periphery of the dynamo body $d$ so that it extends inwards in the neighbourhood of one of the brush holders, and so that its hole $c$ lies opposite a hole in the adjacent end cover $e$ of the body. Also the other component $b$ may be adapted to be inserted through another hole in the end cover $e$ into connection with the brush holder above mentioned. In this case the component $b$ is insulated from the end cover $e$ and is arranged to project beyond the outer face of the end cover with its hole $c$ exposed. When the socket components $a$, $b$ are secured in position their axes (and consequently the axes of their holes $c$) are at right angles to each other (or substantially at right angles).

For use with the socket components $a$, $b$ I employ a pair of plugs $f$, $g$ adapted to be attached respectively to a pair of conductors $h$, $i$ which are required to be connected to the two socket components. The plugs $f$, $g$ are such that the one ($g$) required to engage the socket component $b$ must be inserted first, and when the other plug $f$ is inserted into the other socket component $a$ its outer end lies across the corresponding end of the plug $g$, so preventing the latter from being accidentally disengaged. Ordinarily the two conductors $h$, $i$ are enclosed by a flexible wrapping $j$ to form a single cable, the ends of the conductors to be secured to the plugs $f$, $g$ being exposed. As shown in the drawing the wrapping $j$ and the conductors $h$, $i$ are such that the exposed end parts of the conductors are of unequal lengths, the part to be connected to the plugs $g$ being shorter than the other. Consequently when the plugs $f$, $g$ are in position an accidental pull applied to the cable will tend only to pull the brush plug $g$ out of its socket, and this is prevented by the other plug $f$.

Whilst I have in the foregoing described one application of my invention to making one pair of dynamo connections, it will be understood that other additional connections may be made in like manner on the same dynamo. Also the invention is not limited to dynamo connections as it may be applied in a similar manner to connections required to be made in motors and other electrical apparatus, subordinate details being modified if required to meet different conditions.

Having thus described my invention, what I claim as new and desire to secure by Letters Patent is:

1. Electrical connecting means comprising in combination two pairs of plug and socket components arranged with their axes substantially at right angles to each other, one component of each pair being fixed and the other detachable therefrom, supporting means on which the fixed components are mounted, the detachable components being provided with mutually abutting surfaces whereby one of the detachable components obstructs accidental detachment of the other.

2. Electrical connecting means comprising in combination a pair of fixed sockets, supporting means on which the sockets are mounted with their axes substantially at right angles to each other, and a pair of plugs in detachable engagement respectively with the sockets and provided with mutually abutting surfaces whereby one of the plugs obstructs accidental detachment of the other, one of the said surfaces being formed by one end of one of the plugs, and the other of the said surfaces being formed by one side of the other plug.

FREDERICK TALBOT SHAW.

REFERENCES CITED

The following references are of record in the file of this patent:

UNITED STATES PATENTS

| Number | Name | Date |
|---|---|---|
| 2,277,605 | Palitzsch | Mar. 24, 1942 |
| 2,365,101 | O'Brien | Dec. 12, 1944 |